United States Patent
Avila et al.

(10) Patent No.: US 7,971,423 B2
(45) Date of Patent: Jul. 5, 2011

(54) GAS TURBINE ENGINE COMPRISING A STARTER IN THE AUXILIARY GEAR BOX

(75) Inventors: Chloe Avila, Antony (FR); Jean-Louis Charbonnel, Boissise le Roi (FR); Marie-Lise Dardenne, Fontenailles (FR); Corinne Follonier, Boissise le Roi (FR); Pierre Charles Mouton, Grigny (FR)

(73) Assignee: Hispano Suiza, Colombes (FR)

( * ) Notice: Subject to any disclaimer, the term of this patent is extended or adjusted under 35 U.S.C. 154(b) by 951 days.

(21) Appl. No.: 12/021,594

(22) Filed: Jan. 29, 2008

(65) Prior Publication Data
US 2009/0120098 A1    May 14, 2009

(30) Foreign Application Priority Data

Jan. 30, 2007  (FR) ...................................... 07 00641

(51) Int. Cl.
*F02C 7/06* (2006.01)
*F02C 7/32* (2006.01)
*F02C 7/277* (2006.01)

(52) U.S. Cl. ......................... 60/39.08; 60/787; 184/6.11

(58) Field of Classification Search ................. 60/39.08, 60/39.183, 787; 184/6.11
See application file for complete search history.

(56) References Cited

U.S. PATENT DOCUMENTS

| | | | | |
|---|---|---|---|---|
| 3,844,110 | A | * | 10/1974 | Widlansky et al. .......... 60/39.08 |
| 4,779,413 | A | * | 10/1988 | Mouton ....................... 60/39.08 |
| 5,267,433 | A | * | 12/1993 | Burch ............................. 60/788 |
| 6,681,579 | B2 | * | 1/2004 | Lane et al. ...................... 60/787 |
| 2005/0139019 | A1 | * | 6/2005 | Bristol et al. ....................... 74/6 |
| 2006/0207834 | A1 | * | 9/2006 | Giesler et al. ................... 184/65 |

* cited by examiner

*Primary Examiner* — Ted Kim
(74) *Attorney, Agent, or Firm* — Oblon, Spivak, McClelland, Maier & Neustadt, L.L.P.

(57) ABSTRACT

A gas turbine engine incorporating a starter mounted on the gear box is disclosed. The gas turbine engine includes an AGB gear housing mechanically connected with an engine shaft for driving auxiliary machines and an air starter mounted on the housing, the starter and housing enclosures being in communication such that the lubricating oil of the starter should be distributed from the AGB housing. The oil enclosure of the starter is pressurized by a source of air, being independent from the AGB housing. Advantageously, the pressurization air is taken from a pressurization enclosure of an engine bearing.

10 Claims, 2 Drawing Sheets

GAS TURBINE ENGINE COMPRISING A STARTER IN THE AUXILIARY GEAR BOX

BACKGROUND OF THE INVENTION

1. Field of the Invention

The present invention relates to the field of gas turbine engines and more particularly, turbojet engines. It more particularly relates to the lubrication in an air starter mounted on the power transmission gear box.

2. Description of Related Art

A turbojet engine comprises a housing fixed on the external casing and wherein there are arranged pinions being mechanically connected with an engine shaft to be driven thereby. They are, in turn, connected with machines for auxiliary engines such as pumps or electrical generators supplying the engine. More particularly, such a housing supports the starter that, especially at the ground start, for example mechanically drives the engine shaft, the one of the high pressure rotor in a multi-body engine. The housing is commonly referred to as AGB which is the acronym for the words "Auxiliary Gear Box". Lubricating rotary parts inside the starter casing generally occurs by means of oil taken from the AGB housing. FIG. 1 schematically illustrates a starter lubricating mode of the starter, such as implemented on some turbojet engines. A starter 1 is mounted on the AGB housing 2. A recess-forming interface 3 is arranged between the casing wall 4 and the wall of the AGB housing 2. The starter shaft 5 together with its pinion assembly is supported in the starter casing by a bearing 6. On the left-hand side of FIG. 1 and not shown, the shaft 5 is connected with the air turbine for its driving thereof at the engine start. A turbine seal 5A provides for the tightness of the shaft 5 which crosses the casing at this point.

The lubricating oil of rotary parts of the starter is supplied from the housing 2 into a receptacle 7 located in the interface 3 between the starter and the AGB housing and which is integral with the starter. Such a receptacle 7 communicates through an aperture 8, arranged in the wall 4 of the starter casing, with the enclosure of the latter. The aperture is protected by a strainer for preventing small fragments from being projected into the starter recess. The oil collected in the lower part of the starter oil enclosure is circulated across the rotary parts of the starter through sparging, pumping or any other means, not shown. There is no oil circulation between the enclosure of the starter and that of the housing 2. The level is defined by an overflow 7' of the receptacle 7 of the interface 3. Pressure balance between both enclosures, for the starter and for the AGB, is provided by an aperture 8' arranged in the upper part of the wall 4. Through such a communicating vessel principle, the monitoring of the starter oil level is associated with the monitoring in real time of the engine oil circuit. Thereby, both the clogging of the starter and the risk for contamination of the engine by the oil from the starter are prevented.

The oil contained in the starter enclosure may inadvertently leak outwards for various reasons. The seal 5a between the air turbine shaft and the starter casing may have been damaged; for example, an oil plug may no longer be tight or even, a crack in the casing may have occurred. Should such an event occur, the leakage has no consequence on the starter lubrication through oil supply from the AGB housing across the strainer. However, as the pressure being present in the enclosures is higher than the atmospheric pressure, the air loaded with oil mist from the AGB housing is expelled outwards. Such a supply is then considered as a leakage of the engine lubricating oil and is sent to the pilot. The leakage may cause the engine lubricating oil circuit to be purged, and hence, the engine could be cut-off in flight (IFSD).

A solution disclosed in the U.S. Pat. No. 6,681,579 involves checking the fluid flow between the AGB housing and the starter enclosure. A sealing plate is mounted on the starter on the side of the interface-forming area between the starter and the housing so as to make it possible to insulate the starter enclosure when the pressure inside the latter drops. A valve remains opened in normal operation so as to ensure the pressure balance. Such a valve automatically closes should the pressure drop.

BRIEF SUMMARY OF THE INVENTION

An aim of this invention is to make, by a means different from the prior art solution, the propelling assembly more tolerant to an oil leakage through the starter.

According to this invention, the gas turbine engine comprising a gear housing mechanically connected with an engine shaft for driving auxiliary machines and an air turbine starter mounted on the housing, the starter and housing enclosures being in communication such that the starter lubricating oil be distributed from the AGB housing, is characterized in that the starter oil enclosure is pressurized by a source of air, being independent from the AGB housing.

By means of the solution of the invention, an oil or oil mist loaded air leakage at the level of the starter is not compensated by oil loaded air from the gear housing. The risk of the engine lubricating circuit being purged is then lower.

Furthermore, the propelling assembly is made more tolerant to an oil leakage through the starter by forcing the oil loaded air circulation from the AGB back to room pressure. Pressurization by un-oiled air has the objective of creating a barrier against any oil leakage from the starter enclosure.

According to a first embodiment, the pressurization air flows into an interface area between the starter casing and the housing one. Thus, the pressurization air creates a barrier to the air likely to circulate from the gear housing. As far as such a pressurization air is not itself loaded with an oil mist, then the leakage will mainly consist in air, and the oil will not be driven with such a leakage air.

According to another embodiment, a shaft double seal, with an internal seal and an external seal, being arranged in the starter on the air turbine side, the pressurization air flows between both seals. According to this embodiment, the pressurization air leaks on the internal seal side inside the starter enclosure, which it sweeps before optionally flowing into the interface area between the starter and the housing casing.

Preferably, an air return is arranged between the starter and the housing, being at a lower pressure than the pressurization air supply pressure. Such an arrangement advantageously provides for the connexion with a de-oiler which is going to allow for the collection of the oil forming the oil mist driven with the air flow.

According to an advantageous embodiment, the pressurization air is taken from an external pressurization enclosure of one of the turbojet engine bearings. In so far as the gear housing is located towards the engine front, desirably this would be the first or the second supporting bearing of the turbojet engine shaft. In such a case, the air return is preferably supplied to the internal enclosure of the turbojet engine bearing.

BRIEF DESCRIPTION OF THE DRAWINGS

Two non limitative embodiments of this invention will now be described, referring to the accompanying drawings, wherein.

DETAILED DESCRIPTION OF THE INVENTION

Figure 1:
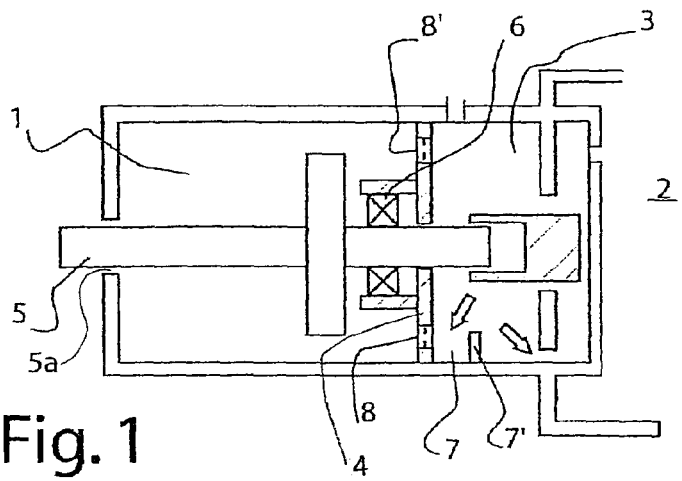
FIG. 1 schematically shows the lubricating mode for a turbojet engine air starter when being mounted on the AGB housing of the latter.
Figure 2:
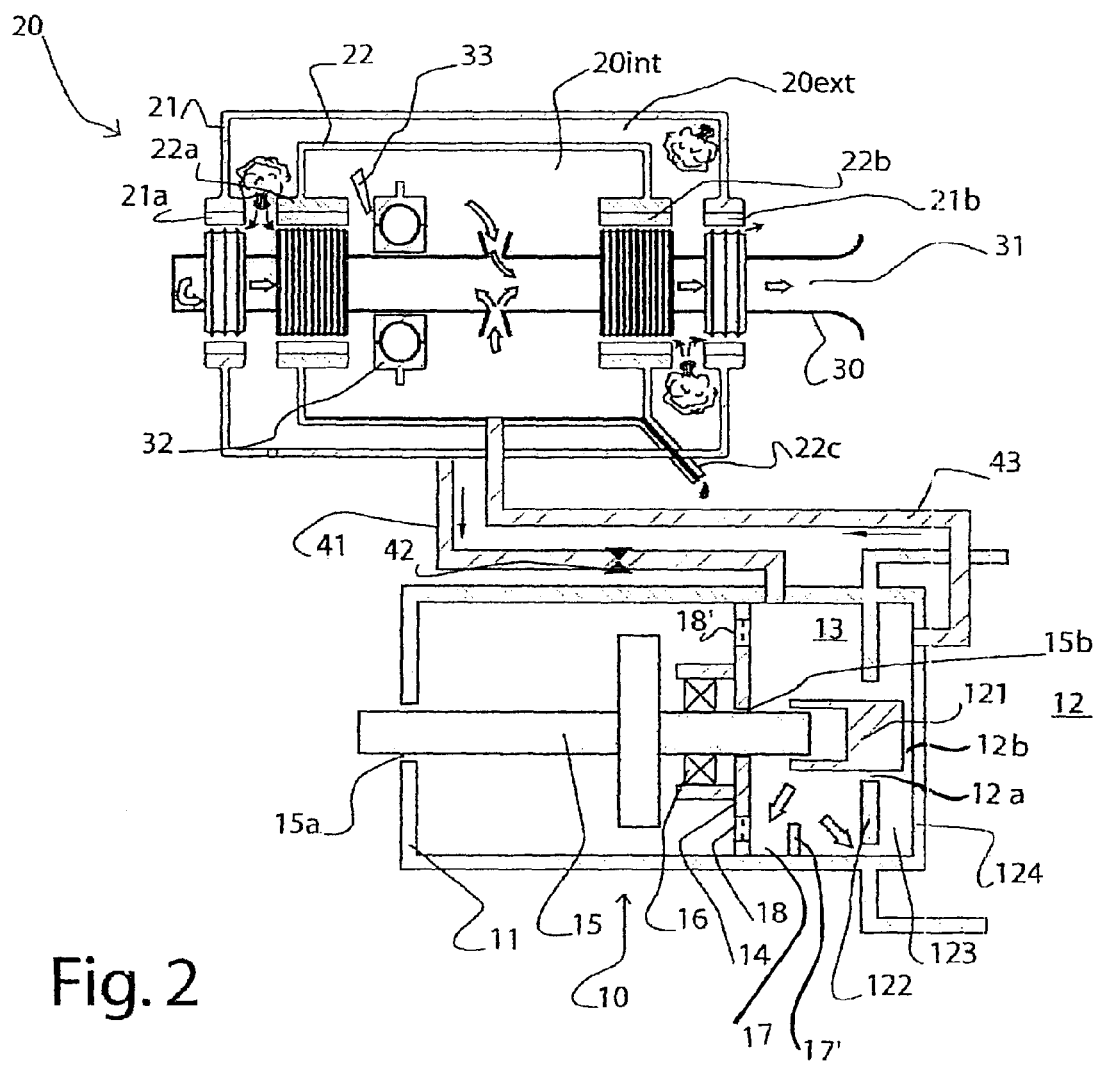
FIG. 2 shows a pressurization circuit for the oil enclosure of an air starter mounted on an AGB housing according to the invention.

Referring now to FIG. 2, there is schematically shown an exemplary arrangement according to a first embodiment of the invention.

The starter 10 comprises an enclosure forming casing 11 for the lubricating oil of rotary parts of the starter 10, being represented as a rotary assembly or shaft 15 rotatably mounted in the casing 11 by a bearing 16. It should be understood that to such a rotary assembly there are associated pinions, reducers, fuses, and other parts forming the starter. As the invention does not refer to the starter structure, it is not useful to further detail an embodiment thereof. Such a rotary assembly 15 is connected on one side with an air turbine, not shown. The turbine drives the assembly 15 at the start of the turbojet engine. A turbine seal 15a provides for a sealing between the rotary assembly 15 and the casing 11. On the other side, the rotary assembly crossing the wall 14 of the casing, with a sealing means 15b, is connected with a pinion 121 being integral with the gears of the gear box 12. As described hereinabove, the AGB gear box or housing 12 is mechanically connected by appropriate transmission shafts with the engine shaft of the turbojet engine. When the turbojet engine is a two or three-shaft or body one, it is most often the high pressure shaft of the engine. The housing is generally mounted on the so-called intermediary casing of the turbojet engine and the transmission shafts are radial and cross the gas flows in one arm of the intermediary casing. The AGB housing being, as such, well known, it will not be further detailed.

An interface recess 13 is arranged between the casing 11 of the starter 10 and the housing 12 of the AGB. Such recess is thus defined between the wall 14 of the starter casing and the wall or insert 122 surrounding an end of the pinion 121. There is at least one recess 123 arranged between the wall 122 and a wall 124, both crossed by the rotary member formed by the pinion 121. There are two seals or neckings 12a and 12b between the pinion 121 and the walls 122 and 124.

As described hereinabove, the lubricating oil of the starter enclosure is supplied from the enclosure of the AGB housing 12. Such oil is collected in the bottom of the casing 11 from where it is distributed through pumping or any other means in the enclosure, and communicates with a receptacle 17 in the interface area 13 through an opening 18 or any other means in the wall 14. The oil flows into the interface area 13 through an overflow 17' from where it circulates through the AGB housing. There is also another passage 18' between the starter enclosure and the interface area 13.

The system of the invention applies the pressures of a bearing 20 enclosure. In a turbojet engine, shafts are supported in the stator structure by bearings. Such bearings are lubricated and enclosed in a double pressurized enclosure for orienting the oil circulation towards an area where it is collected; moreover, the oil loaded air is de-oiled appropriately. Such means are known as such; the invention makes use of them for pressurizing the starter enclosure as well as for collecting the leakage oil.

On the figure, there is schematically illustrated an enclosure 20. The shaft 30 of the engine is supported by a bearing system 32 which receives oil through the nozzle 33. The shaft and the bearing are enclosed in a double enclosure 20, namely an internal enclosure 20int and an external enclosure 20ext. The jacket 22 of the internal enclosure 22 is made tight with respect to the shaft 30 by labyrinth seals 22a and 22b on both sides of the bearing 32. The jacket 21 of the external enclosure 20ext encloses the internal enclosure 20int and is also tight by means of labyrinth seals 21a and 21b, respectively.

For preventing the oil in the internal enclosure 20int from leaking, the external enclosure 20ext is supplied with pressurization air at a pressure P1 slightly higher than P2 of the internal enclosure 20int. Thereby, an air circulation is created from the enclosure 20ext to the enclosure 20int through the seals 22a and 22b. The lubricating oil is recovered into an oil recovering area 22c. The oil loaded air of the internal enclosure 20int is processed in a de-oiler, not shown, before being ejected through the shaft 30 by an aeration channel 31 to the back of the engine.

The invention makes advantageously use of such a source of air at the pressure P1 for pressurizing the starter enclosure. In an exemplary embodiment of FIG. 2, a conduit 40 connects the external enclosure 20ext with the enclosure of the starter 10; here, the conduct opens into the interface recess. Because of the existing communications between the interface recess 13 and the starter enclosure, the latter is substantially at the pressure P'1 in the recess 13. The pressure P'1 is determined by the calibrated opening 41 provided in the conduit 40.

There is contemplated an air return conduit 43 towards the internal enclosure 20int of the double enclosure 20. The return 43 is provided on a wall 124 of the AGB housing 12, inside with respect to the interface 13 forming wall 122.

In incident-free operation, the starter enclosure 10 is pressurized by air from the external enclosure 20ext independently from the enclosure of the AGB housing 12 which is itself supplied with pressurization air as well. The pressurization pressures could be equal. The pressure present in the starter could also be higher than the pressure in the housing 12.

The air circulates from the interface recess between both walls 122 and 124, and then is guided towards the internal enclosure 20int. Should a leakage occurs in the starter enclosure, the pressure drops and the air circulates from the interface recess 13 to the starter enclosure. Such air is less loaded with oil mist than the air from the AGB. The oil leakage is thus lower than compared to the case where the pressurization would occur through the enclosure of the AGB 12. Such a solution also makes it possible to recover the oil being driven by the conduct 43 making use of the de-oiler, the lubricating system of the shaft bearings of which is provided for.

The source of pressurization air could be the pressurization enclosure for any one of the shaft bearings. More generally, the pressurization could be provided by any source of air or even of gas, in so far as it is able to provide the desired pressure level.

Figure 3:
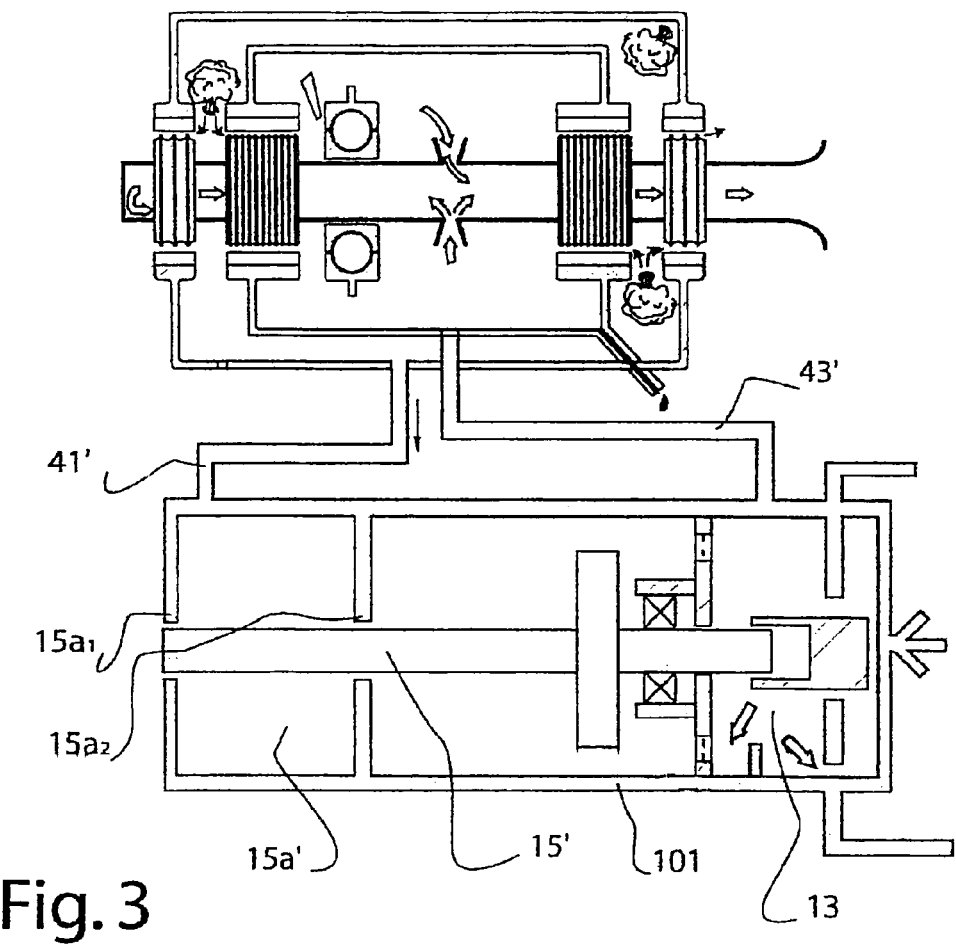
FIG. 3 shows an alternative pressurization embodiment.

On FIG. 3, there is illustrated an alternative embodiment, wherein the pressurization air does not flow into the interface forming recess between the starter and the gear housing, but instead, into a pressurization enclosure at the opposite terminal of the rotary assembly.

Reference annotations showing the same parts of the starter have identical primed numerals. The starter 10' comprises a sealing double enclosure 15a' between two seals 15a1 and 15a2. Both seals are arranged such that the pressurized air from the enclosure 15a' leaks towards the starter enclosure 10'. The seals are preferably a carbon seal for the external seal 15a1 and a labyrinth seal for the internal seal 15a2. Such an enclosure 15a' is in communication with the external enclosure 21 of the pressurization double enclosure of the bearing through a conduit 41'. The air return towards the internal enclosure 22 is provided by a conduit 43' being connected with the interface recess 13.

The invention claimed is:

1. A gas turbine engine, comprising:
   an AGB gear housing mechanically connected with an engine shaft for driving auxiliary machines and an air starter mounted on the housing, the starter and housing enclosures being in communication such that lubricating oil of the starter be distributed from the AGB housing,
   wherein the oil enclosure of the starter is pressurized by a source of air, being independent from the AGB housing.

2. An engine according to claim 1, wherein pressurization air flows into an interface area between a casing of the starter and that of the housing.

3. An engine according to claim 2, wherein an air return is arranged between the starter and the housing at a lower pressure than pressurization air supply pressure.

4. An engine according to claim 3, wherein the air return is fed towards a de-oiler.

5. An engine according to claim 4, comprising an air return towards an internal enclosure of a turbojet engine bearing.

6. An engine according to claim 1, wherein, with a double seal of a rotary assembly of the starter being arranged on a side of an air turbine, pressurization air flows between both seals forming the double seal.

7. An engine according to claim 6, wherein an air return is arranged between the starter and the housing at a lower pressure than pressurization air supply pressure.

8. An engine according to claim 7, wherein the air return is fed towards a de-oiler.

9. An engine according to claim 1, wherein pressurization air is taken from an external pressurization enclosure of a turbojet engine bearing.

10. An engine according to claim 8, comprising an air return towards an internal enclosure of a turbojet engine bearing.

* * * * *